Feb. 14, 1950 H. J. KOSSOW 2,497,173
BAGGAGE SET FOR AUTOMOBILE TRUNKS
Filed Oct. 10, 1947
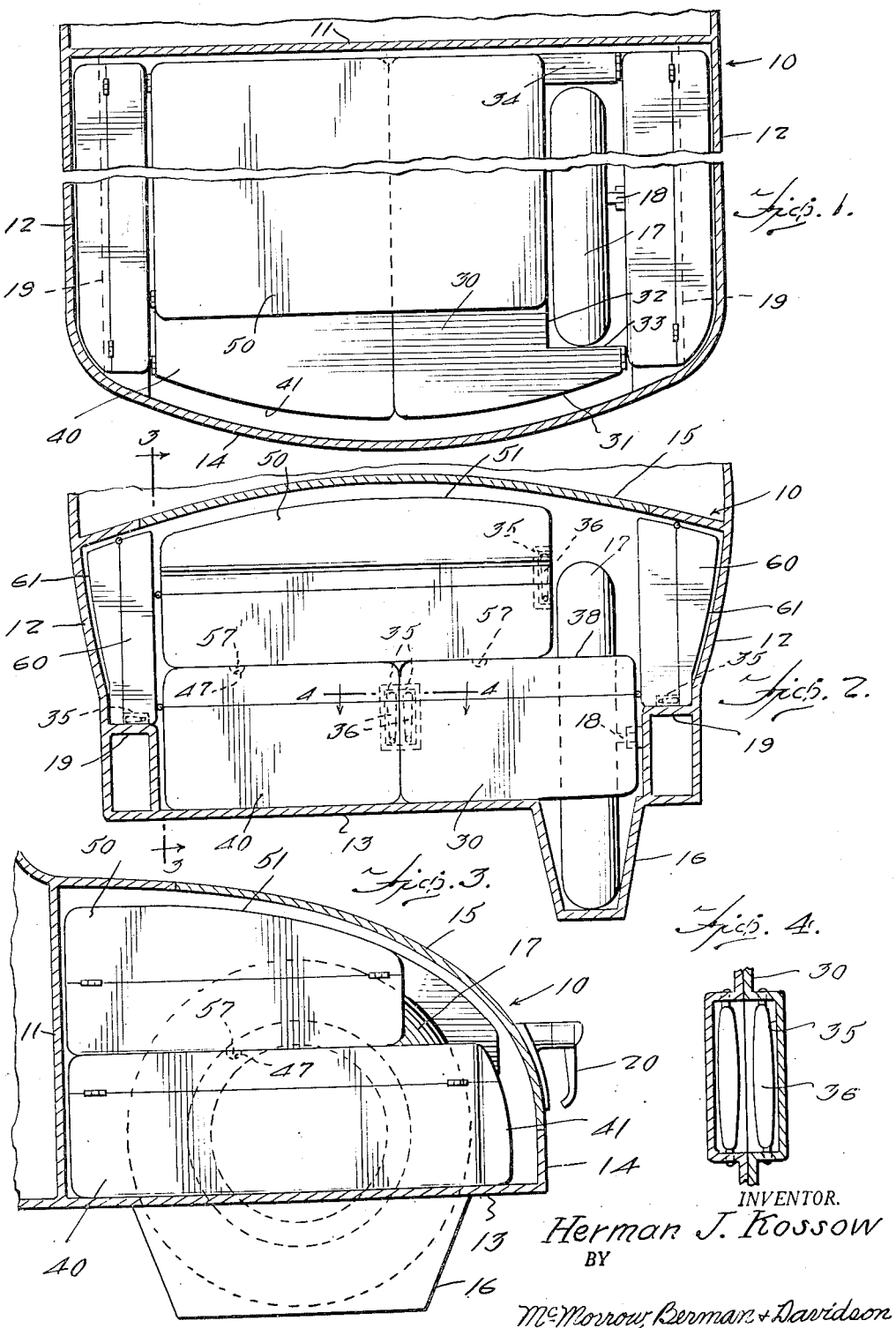
INVENTOR.
Herman J. Kossow
BY
McMorrow, Berman + Davidson
ATTORNEYS

UNITED STATES PATENT OFFICE 2,497,173

BAGGAGE SET FOR AUTOMOBILE TRUNKS

Herman J. Kossow, Washington, D. C.

Application October 10, 1947, Serial No. 779,136

2 Claims. (Cl. 224—42.42)

My invention relates to sets of baggage, and more particularly to such sets which are adapted to fit within the trunk of an automobile with a minimum of waste space.

With the foregoing in view, an object of my invention is to provide an improved baggage set for an automobile trunk.

A further object is to provide an improved baggage set for an automobile trunk which comprises a plurality of pieces of hand baggage adapted to be assembled within the automobile trunk to comprise a unit having a contour substantially complementary to that of the interior of said trunk.

A further object is to provide an improved baggage set for an automobile trunk such as that last described, wherein at least one of said pieces of baggage is formed to interfit with a spare wheel and tire in said trunk to prevent horizontal shifting of said unit.

A further object is to provide an improved baggage set for an automobile trunk which comprises a plurality of pieces of baggage adapted to be assembled within the trunk to comprise a unit having a contour substantially complementary to that of said trunk, and wherein at least two of said pieces of baggage are formed to provide complementary interfitting means adapted to interfit to prevent horizontal shifting of individual pieces of baggage after their assembly into a unit.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a plan view of the assembled baggage set in position in an automobile trunk, said trunk being shown in horizontal section;

Figure 2 is a rear view of the assembly of Figure 1, the automobile trunk being shown in transverse vertical section;

Figure 3 is a longitudinal vertical section taken substantially on the plane of the line 3—3 of Figure 2;

Figure 4 is an enlarged fragmentary horizontal section taken substantially on the plane of the line 4—4 of Figure 2.

Referring specifically to the drawing, wherein like reference characters have been used throughout to designate like parts, 10 designates generally a trunk of an automobile which has a forward wall 11, side walls 12, a floor 13, and may be provided with a low rear wall 14. The trunk 10 is open at the top, which is closed by a lid 15 which may be lifted by a handle 20. The floor 13 of the trunk is formed to provide a depending well 16 for the reception of a spare tire and wheel 17 which is mounted therein by any suitable mounting means 18 for ready detachment. The well 16 extends longitudinally of the trunk, and the tire and spare wheel 17 is held vertically therein longitudinally of the trunk. The sides 12 of the trunk may be formed inwardly thereof with abutments 19 arising from the floor 13. The usual trunk of the automobile thus described comprises an interiorly-concaved rear wall which merges into the interiorly-concaved lid or door 15. This structure provides a space which is substantially triangular in elevation and substantially rectangular in end view and in plan, but having one curved wall in the latter two views. While I am aware that all automobile trunks do not position the tire and spare wheel 17 in the position shown herein, it is to be understood that my invention is equally applicable when the spare tire and wheel is positioned otherwise in the trunk.

The baggage set according to the invention comprises a plurality of pieces of hand baggage. One of the pieces 30 is formed to provide a convex wall 31 which is complementary to the interiorly-concaved end wall 14 and lid or cover 15. The bottom of the piece 30 is recessed, as at 32, to provide depending legs 33 and 34, which are adaptable to interfit with the spare tire and wheel 17 to maintain the piece 30 in the trunk against horizontal shifting. The top of the piece 30 is formed with an inwardly-directed recess 35, Figure 4, in which the usual carrying handle 36 is pivotally mounted. The recess 35 permits the handle 36 to be movable into and out of an operative position, whereby in the latter position it is entirely inwardly of the top of the bag to present a flat surface, as clearly shown in Figure 3. An upper side surface 38 of the piece 30 is formed to provide at least one inwardly-directed recess 37 for a purpose to be described later.

In the embodiment shown, a second baggage piece 40 is positioned on the floor 13 of the trunk laterally of the piece 30, and is formed to provide an end wall 41 which is convex and complementary to the interiorly-concaved end wall 14 and lid 15 of the trunk. As is clearly seen in Figure 1, when the piece 40 is assembled with the piece 30, the end walls 41 and 31 thereof combine to form a substantially unbroken arcuate surface.

The top of the baggage piece 40 is formed with a recess 35 for the handle 36 which is substantially identical to the like-designated recess and handle for the baggage piece 30. An upper side of the baggage 40 is formed to provide an inwardly-directed recess 47 for a purpose to be described later.

A third piece of baggage 50 is adapted to sit atop the pieces 30 and 40 and is substantially rectangular in plan, Figure 1. An upper side wall 51 of the baggage piece 50 is preferably convex, whereby to be complementary to the interiorly-concaved lid 15 of the trunk. The top of the baggage piece 50 is formed to provide a handle recess 35 for the handle 36 which is substantially identical to the like recess and handle previously described. The under side wall of the baggage piece 50 is formed to provide a pair of laterally-spaced and depending bosses 57 which are complementary to the recesses 37 and 47 in the baggage pieces 30 and 40 and adapted to fit therein to prevent horizontal shifting not only of the baggage piece 50, but of the baggage pieces 40 and 30. Thus, the bosses 57 and recesses 37 and 47 comprise means for locking the pieces 30, 40 and 50 together as a unit, which unit has an exterior contour substantially complementary to the interior contour of the trunk 10.

If desired, small pieces of baggage 60 may be formed and sized to sit atop the abutments 19 on either side of the trunk 10. As is apparent from Figure 3, such pieces 60 have a side wall 61 shaped to be complementary to the interior contour of the side walls 12 of the trunk.

The provision of the recessed handles 36 of all of the baggage pieces, including the auxiliary pieces 60, enables the baggage pieces to fit flush within the compartment or trunk 10 and to fit flush with each other, whereby the assembly of the baggage pieces into a compact unit and the retention of the pieces in such unit against horizontal shifting relative to each other is readily accomplished. By maintaining the unitary structure of the set in use, not only does the set take advantage of virtually all the space within the trunk 10, but lateral and longitudinal horizontal shifting of the baggage, to say nothing of vertical movement of the same, is substantially prevented whereby wear of the surface finishes of the separate pieces of luggage is largely eliminated.

While I have shown and described what is now thought to be the preferred embodiment of the invention, it is to be understood that the same is susceptible of other forms and expressions.

Consequently, it is not my intention to limit myself to the precise structures shown hereinabove, except as hereinafter claimed.

I claim:

1. The combination with an automobile baggage compartment including, a floor, a vertically disposed rear wall, and a curved lid pivotally mounted on said rear wall for movement into and out of closing relation with respect to said floor and rear wall to thereby form a closed compartment, of a set of luggage positioned within said closed compartment and adapted to conform to the shape of the latter, said set of luggage comprising a first piece of luggage resting upon said floor and having one end wall abutting said rear wall, and having the other end wall shaped to conform to the adjacent portion of said curved lid, a second piece of luggage resting upon said floor in side by side abutting relation with respect to said first named piece of luggage, said second named piece of luggage having one end wall abutting said rear wall and having the other end wall shaped to conform to the adjacent portion of said curved lid, a third piece of luggage arranged transversely of said first and second named pieces of luggage and resting upon the latter, and interengaging means on the bottom of said third piece of luggage and the top of said first and second named pieces of luggage for holding said pieces in assembled relation with respect to each other, the top wall of said third named piece of luggage being shaped to conform to the adjacent portion of said curved lid.

2. The combination with an automobile compartment including, a floor having a depending well for the reception of a spare tire and wheel therein, a vertically disposed rear wall, and a curved lid pivotally mounted on said rear wall for movement into and out of closing relation with respect to said floor and said rear wall to thereby form a closed compartment, of a set of luggage positioned within said closed compartment and adapted to conform to the shape of the latter, said set of luggage comprising a first piece of luggage resting upon said floor and having one end wall abutting said rear wall, and having the other end wall shaped to conform to the adjacent portion of said curved lid, the bottom of said first piece being recessed inwardly to provide depending legs adapted to interfit with said spare tire and wheel to thereby position said first piece of luggage within said compartment, a second piece of luggage resting upon said floor in side by side abutting relation with respect to said first named piece of luggage, said second named piece of luggage having one end wall abutting said rear wall and having the other end wall shaped to conform to the adjacent portion of said curved lid, a third piece of luggage arranged transversely of said first and second named pieces of luggage and resting upon the latter, and interengaging means on the bottom of said third piece of luggage and the top of said first and second named pieces of luggage for holding said pieces in assembled relation with respect to each other, the top wall of said third named piece being shaped to conform to the adjacent portions of said curved lid.

HERMAN J. KOSSOW.

REFERENCES CITED

The following references are of record in the file of this patent:

UNITED STATES PATENTS

| Number | Name | Date |
|---|---|---|
| 1,074,133 | Neustaeder | Sept. 30, 1913 |
| 1,331,862 | Claus | Feb. 24, 1920 |
| 2,194,993 | Wuest | Mar. 26, 1940 |
| 2,418,717 | Machado | Apr. 8, 1947 |

FOREIGN PATENTS

| Number | Country | Date |
|---|---|---|
| 661,511 | France | Mar. 5, 1929 |